United States Patent [19]
Vossen

[11] 3,772,117
[45] Nov. 13, 1973

[54] METHOD FOR THE PERMANENT MAKING OF TOOTHED BELTS

[75] Inventor: Karl Vossen, Aachen, Germany

[73] Assignee: Uniroyal Englebert Deutschland AG, Aachen, Germany

[22] Filed: Sept. 22, 1970

[21] Appl. No.: 74,428

[52] U.S. Cl. ................ 156/140, 74/216.5, 74/232, 123/195 A, 156/257, 156/268, 156/265, 156/293, 156/298, 156/303.1

[51] Int. Cl. ............................................. B29h 7/22

[58] Field of Search ............ 156/293, 298, 137–142, 156/244, 257, 268, 277, 278, 280, 390, 450, 156/460, 471, 500, 514; 74/216.5, 232, 233; 161/413.9

[56] References Cited
UNITED STATES PATENTS

| | | | |
|---|---|---|---|
| 3,323,167 | 6/1967 | Verges et al. | 156/137 X |
| 3,078,206 | 2/1963 | Skura | 156/140 |
| 2,099,126 | 11/1937 | Larsen | 156/293 X |
| 3,218,208 | 11/1965 | Molen | 156/293 X |

OTHER PUBLICATIONS

1957 Ford Truck Shop Manual, Index page, pages 1–48, 1–49, Copyright 1957.

Primary Examiner—Alfred L. Leavitt
Assistant Examiner—C. B. Cosby
Attorney—Steven H. Bazerman

[57] ABSTRACT

Permanent markings are formed on an elastomeric toothed belt for alignment of the drive system in which the belt is to be used by the application of strips of colored elastomeric material transversely across the belt in predetermined relationship with the belt teeth or gaps prior to the curing of the belt. The colored material enters into a firm bond with the elastomer of the belt upon curing.

6 Claims, 5 Drawing Figures

Patented Nov. 13, 1973

3,772,117

INVENTOR.
KARL VOSSEN
BY
ATTORNEY

3,772,117

METHOD FOR THE PERMANENT MAKING OF TOOTHED BELTS

BACKGROUND OF THE INVENTION

This invention relates to an apparatus and a method for the marking of elastomeric toothed belts and more particularly to the placing of markings on such belts prior to their curing to form durable markings without damage to the strength of the belt.

The terms "elastomer" and "elastomeric" are used herein to designate natural or synthetic rubber compositions, organic plastics having similar physical characteristics, and mixtures of such materials.

Power transmission belts consisting of a toothed elastomeric body with a non-stretchable load supporting filament, such as seen in U.S. Pat. No. 2,507,852 issued to R. Y. Case on May 16, 1950, are finding wider fields of application, particularly in the replacing of gear and chain drives. Because of the engagement accuracy and nonstretch characteristics of such belts, they are suited for applications in which the pulleys, drives and the like to be interconnected by the belt have precisely determined angular relationships which must be maintained during operation. For example, toothed belts have been used to replace the traditional camshaft drives in internal combustion engines. The camshaft must be brought into a predetermined position relative to the crankshaft and must maintain that position throughout its operation. It is therefore desirable to provide toothed belts with spaced markings on their back in predetermined coordination with the belt teeth for alignment of the drive system in which the belt operates.

SUMMARY OF THE INVENTION

It is the object of the present invention to provide apparatus and a method for applying durable markings to the belts for alignment of the drive system in which the belt is to be used in a simple and inexpensive manner.

According to the present invention permanent markings are formed by the application of strips of colored material transversely across the belt carcass in predetermined relationship with the belt teeth or gaps prior to curing of the belt. The material is such that upon hardening it enters into a firm bond with the elastomer of the belt. A proper material would be for example a dyed elastomer which is cured concurrently with the belt carcass. In most applications the elastomer should be the same as that used in the belt body with the addition of a dye for coloring. As a result, the marking substance forms a homogeneous unit with the rest of the belt after curing. Of course, separate colors for strips at different positions for allignment of each of the pulleys in the system may be provided.

Since the application of the marking is prior to curing, the belt may be notched to allow the use of a thick layer of marking material. Such deep application increases the durability of the marking and guarantees that in those cases where the back of the belt blank is ground after curing for accuracy or other reasons, the markings will not be removed. Since the marking substance is applied prior to curing, there is no danger that the belt will be weakened by the placing of the marking material. Of course, such weakening could happen with the application of the marking after the curing of the belt.

While the belt may be marked by injecting dye directly into the back of the belt carcass, it is preferable to apply the marking in the form of strips of colored elastomeric substance. Such strips may be applied by the spraying, extruding or the placing of preformed strips of elastomer in grooves in the belt back. If preformed strips of marking material are to be directly laid in the grooves, they will hold their shape better if they are partially cured before application or if inserts of another more rigid material are placed in the centers of the strips.

The present invention may be implemented by a device which is correlated with the teeth of the belt by a chucking and measuring means. A marking means would be mounted on a carriage which travels across the belt. After the build-up of the belt carcass, the marking device would be moved across the back of the carcass at points selected by the chucking and measuring means to spray, extrude, or otherwise apply to the back of the belt a dyed elastomeric substance. A short distance ahead of the spray nozzle or other elastomer applying means may be a device which produces a notch in the belt carcass into which the elastomer is laid. A roller may also follow the spraying or other applying means in order to embed the marking substance into the back of the belt by the application of pressure.

More simply, according to the present invention strips of marking material may be laid across the build-up drum after the carcass of the belt is formed but before the molding and curing of the belt. They are both positioned and fastened by pins or slots on the external ends of the buildup drum. These attaching elements are spaced around the circumference of the build-up drum and are positioned at predetermined distances along the length of the carcass so that the resulting markings are properly situated for alignment of the drive system. The strips will be molded into the back of the belt during curing. As noted, to prevent the strips from moving during the molding operation and to allow deeper application of the marking material, grooves may be provided in the belt carcass into which the strips are laid. If the strips are of such width in relationship to the tooth width that they are not deformed laterally beyond the tooth limits during the subsequent molding operation, a notch may not be needed.

BRIEF DESCRIPTION OF THE DRAWINGS

The method and apparatus are illustrated in the accompanying drawings in which.

DESCRIPTION OF THE PREFERRED EMBODIMENT

Figure 1:
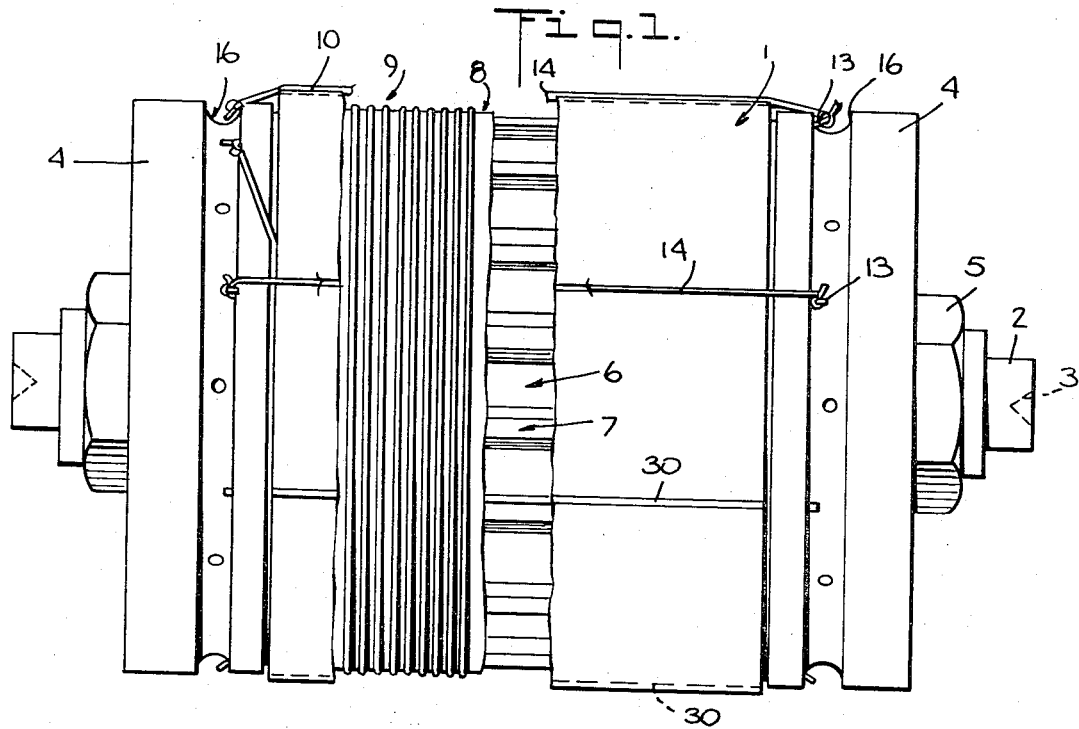
FIG. 1 is a front view of a partly broken away build-up drum with a carcass on it.

The build-up drum and belt mold seen in FIG. 1 is of a type normally used in the construction of timing belts and it, along with its method of use, is fully disclosed in U.S. Pat. No. 3,078,206 issued to W. A. Skura on Feb. 19, 1963. The drum 1 has a central sector 15 on which the carcass is built. Equally spaced around the circumference of center portion 15 are depressed portions 6 and raised portions 7 corresponding to the teeth and teeth gaps respectively of a finished toothed belt. The central section 15 of the drum is limited by end plates 4 which are firmly pressed against the center section 15 by means of nuts 5 mounted on shaft 2. The shaft 2 of the build-up drum has centering holes 3 for mounting the drum in an appropriate holding device.

The end plates 4, may have annular grooves 16 having holes 12 for the ventilation of the drum during curing. End portion 4 has a fastening element such as a slot 11 in which the end of the tensile member 9 is fastened.

Normally the unmolded belt carcass consists of a abrasion resistant, stretchable fabric 8, a tensile member 9 wound on the former and the elastomeric body 10 positioned on top of the tensile member 9. During molding, the elastomeric body 10 is pressed through the inserts into grooves 6 of the build-up drum.

Figure 2:
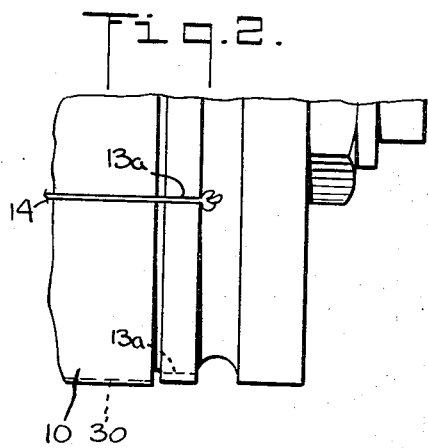
FIG. 2 is a partial front view of another embodiment of build-up drawn according to the present invention with a belt carcass on it.

According to the present invention, as seen in FIGS. 1 and 2 the build-up drum 1 has on the end plates 4 fastening elements in the form of pins 13 or slots 13a, onto or through which can be fastened the ends of strips 14 of marking material. The strips 14 are fastened by tying them around pins 13 or on the outer side of slots 13a as seen in FIGS. 1 and 2 respectively. The marking material is preferably of the same elastomeric material from which the belt is formed with the addition of a dye such that the strips 14 are colored differently from the belt. The fasten elements 13 and 13a are provided at predetermined spots on the circumference of the build-up drum corresponding to the positioning of the markings on the back of the finished belt. These fastening elements 13 and 13a may be marked or numbered to facilitate the use of different colored markings or sequence of markings. The fastening elements 13 and 13a may also serve to align a notching device or a notch ruler by means of which a notch 30 is produced across the belt and into which the marking strip 14 may be thereafter stretched as described herein.

Figure 3:
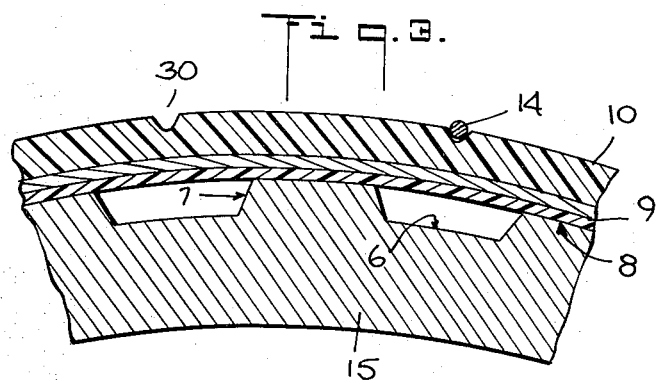
FIG. 3 is a cross section of a build-up drum with an unmolded carcass positioned thereon in the process of being marked according to the present invention.

As can be seen in FIG. 3, at points corresponding to the attaching means 13 or 13a a notch 30 has been produced into which the preformed strip 14 is positioned. Strip 14 may be partially cured or have a strengthening insert to insure that it will retain its shape. The strip 14 and notch 30 may have various cross sectional shapes. FIG. 3 shows a strip 14 of circular cross section. The notch prevents the strip 14 from shifting during the molding operation, as well as allowing the use of a thicker strip 14 of marking material.

Figure 4:
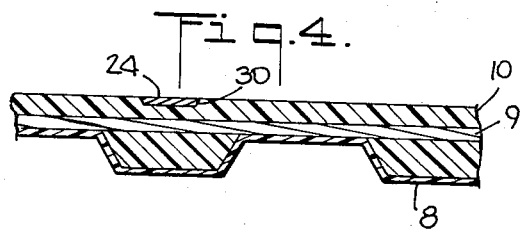
FIG. 4 is a longitudinal section of a tooth belt with a durable marking according to the present invention.

FIG. 4 shows the shape of a belt according to the present invention after molding and curing. A flat marking strip 14 and its notch 30 have been molded and cured to produce a flat marking 24.

Figure 5:
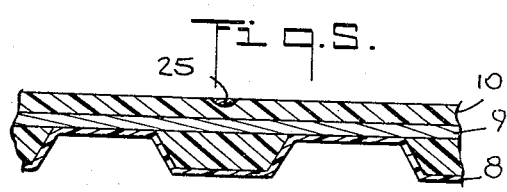
FIG. 5 is a longitudinal section of another embodiment of the belt marked according to the present invention.

FIG. 5 illustrates the resulting belt when the marking strip 14 had a circular cross-section. In the embodiment of FIG. 5 the belt was ground after its completion so that the resulting marking 25 has a semi-circular cross section. Grinding has the advantage of clearing the marking 25 since part of the carcass body 10 may have been pushed over the stripe 14 during the molding operation.

The markings may also be applied to the belt by spraying or extruding a dyed elastomer strip into the notch on the back of the belt carcass. This could be done by the use of a spraying or extruding apparatus transversely movable across the back of the belt carcass.

The marking strip 14 may be applied to the belt carcass without the use of a notch. The marking element 14 in the form of a flat strip 14 is applied across the belt carcass and thereafter during subsequent molding and hardening operations is pressed and molded into the material of the back of the belt. As a result, strip 14 becomes part of the homogeneous surface of the belt. If no notch is used, the strip should be of such a width in comparison to the tooth width that it is not deformed laterally beyond the tooth limits during the subsequent molding operation.

While the preferred form of this invention has been described, it is to be understood that still other changes may be made without departing from the spirit of the invention and the scope of the appended claims.

Having thus described my invention, what I claim and desire to protect by letters patent is:

1. A method of marking elastomeric timing belts for alignment of the drive system in which the belt is to be used consisting of making at least one groove transversely across the back of the belt carcass at a point corresponding to an alignment point for the belt in use prior to the curing of a belt carcass; applying a strip of elastomer dyed a color different from that of the belt in said groove the strip of dyed material having a rigid reinforcing material, and thereafter curing the belt carcass so that the strip of dyed elastomer enters into a firm bond with the elastomer of the belt.

2. The method according to claim 1 wherein the strip of dyed material is reinforced by an insert of more rigid material.

3. A method of making a toothed belt having markings for alignment of the drive system in which the belt is to be used consisting of winding a load carrying band around the outer circumference of a cylindrical mold having axially extending grooves therein, placing a layer of uncured elastomeric material adjacent to said band, making at lease one groove transversely across the backside of the resulting belt carcass at a point corresponding to the one to be marked; applying a strip of at least partially cured elastomeric material dyed a color different from the belt in said groove; and applying heat and pressure to said elastomeric material and said strip to force both said uncured elastomeric materials into the mold such that they are both cured and the strip forms a bond with the back surface of the resulting molded toothed belt.

4. The method according to claim 3 wherein the strip of dyed elastomer is formed before application to the belt carcass and is stretched across the backside of the belt carcass.

5. The method according to claim 4 wherein the strip of dyed material is reinforced by an insert of more rigid material.

6. The method according to claim 4 wherein the strip of dyed material is reinforced by partially curing said strip before stretching said strip across the belt carcass.

* * * * *

UNITED STATES PATENT AND TRADEMARK OFFICE
CERTIFICATE OF CORRECTION

PATENT NO. : 3,772,117
DATED : July 9, 1975
INVENTOR(S) : KARL VOSSEN

It is certified that error appears in the above-identified patent and that said Letters Patent are hereby corrected as shown below:

Claim 3, column 4, line 44, the word "lease" should be replaced by --least--.

Signed and Sealed this ninth Day of September 1975

[SEAL]

Attest:

RUTH C. MASON
Attesting Officer

C. MARSHALL DANN
Commissioner of Patents and Trademarks